(12) United States Patent
Sokolova et al.

(10) Patent No.: US 7,561,930 B2
(45) Date of Patent: Jul. 14, 2009

(54) DYNAMIC MODIFIER FUNCTION BLOCKS FOR USE IN A PROCESS CONTROL SYSTEM

(75) Inventors: Marina Sokolova, Austin, TX (US);
Marty James Lewis, Cedar Park, TX (US); Larry Oscar Jundt, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 232 days.

(21) Appl. No.: 11/537,839

(22) Filed: Oct. 2, 2006

(65) Prior Publication Data
US 2008/0189526 A1    Aug. 7, 2008

(51) Int. Cl.
G05B 19/42    (2006.01)
G06F 9/00    (2006.01)
(52) U.S. Cl. .................................. 700/87; 712/226
(58) Field of Classification Search .................. 700/23, 700/86, 87, 89; 712/233, 226, 248; 717/168–173
See application file for complete search history.

(56) References Cited

U.S. PATENT DOCUMENTS 6,510,351 B1    1/2003    Blevins et al.
2006/0095918 A1*    5/2006    Hirose ..................... 718/104
2007/0038975 A1*    2/2007    Lennon et al. ............. 717/101

FOREIGN PATENT DOCUMENTS

GB    2351371    12/2000
GB    2356266    5/2001

OTHER PUBLICATIONS

UK Intellectual Property Office, Patents Act 1977: Search Report Under Section 17, Dec. 18, 2007, 3 pages.

* cited by examiner

Primary Examiner—Ryan A Jarrett
Assistant Examiner—Chad Rapp
(74) Attorney, Agent, or Firm—Hanley, Flight and Zimmerman, LLC (57) ABSTRACT

Dynamic modifier function blocks for use in a process control system are disclosed. In accordance with one aspect, an example function block is stored on a machine readable medium for use in a process control system. The example function block includes a base function block that causes a machine to perform an algorithm associated with the process control system and at least one attribute located within the base function block that causes the machine to delete or instantiate at least one dynamic modifier function block.

38 Claims, 6 Drawing Sheets

DYNAMIC MODIFIER FUNCTION BLOCKS FOR USE IN A PROCESS CONTROL SYSTEM

FIELD OF THE DISCLOSURE

The present disclosure relates generally to process control systems and, more particularly, to dynamic modifier function blocks for use in a process control system.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, device controllers, valves, valve positioners, switches and transmitters (e.g., temperature, pressure and flow rate sensors), perform functions within the process control system such as opening or closing valves and measuring process parameters. A central process controller receives signals indicative of process measurements made by the field devices and/or other information pertaining to the field devices, uses this information to implement a control routine, and generates control signals that are sent over the buses or other communication lines to the field devices to control the operation of the process control system.

Recently, the process control industry has moved toward the use of digital control and communications between field devices, controllers, and other entities making up a process control system. As a part of this move toward digital control and communications, a number of standard digital as well as combined analog and digital open communication protocols have been developed to facilitate the interoperation field devices and controllers. For example, communication protocols such as HART®, PROFIBUS, WORLDFIP, Device-Net, CAN™, and FOUNDATION Fieldbus ("Fieldbus") are now widely used to enable faster and more information-rich communications between field devices and controllers. Specifically, in addition to control parameters and other control-related information or data, the above-mentioned communication protocols may enable, for example, configuration information, as well as other types of information, to be communicated between field devices and between field devices and controllers. Further, the standardization and open nature (i.e., non-proprietary nature) of the standards associated with these communication protocols enables devices made by different manufacturers to be readily integrated within a single process control system, thereby simplifying replacement of devices, enabling a more optimal selection of field devices to implement a particular application, etc.

Many of the above-mentioned digital or combined analog and digital communication protocols facilitate the implementation of distributed control schemes. In particular, these communication protocols often provide a framework or architecture that enables field devices to interoperate directly with one another to perform a process control application or a part of a process control application without the required intervention of a centralized process controller. Such decentralization of the control execution can simplify the design of process control routines, reduce communications and processing overhead associated with a central controller, improve the speed at which information is received by devices needing the information and, thus, the ability of the receiving devices to take appropriate action more quickly based on the received information, etc.

Some of the digital and combined analog and digital communication protocols that facilitate distributed control utilize a basic building block or software construct commonly referred to as a function block. In general, function blocks may be (but are not necessarily) generated using a high level computer language (e.g., C, C++, etc.) that, when executed (e.g., via a processor) perform one or more algorithms or sequences of operations. There are multiple types of function blocks, where each type of function block typically implements a specific part or portion of a process control routine. Generally, function blocks implement input, control, output, as well as other functions within a process control system and can be downloaded and instantiated within controllers and/or field devices distributed throughout a process control system. For example, an analog input (AI) function block may be instantiated within a sensor or transmitter configured to measure a process parameter (e.g., a temperature, a flow, etc.), a proportional-integral-derivative (PID) function block may be instantiated within a controller, which may be in communication with the sensor or transmitter performing the AI function block, an analog output (AO) function block may be instantiated within another field device such as a valve that is responsive to the controller and which affects one or more parameters measured by the AI function block. Thus, in this manner, function blocks of different types can be instantiated within field devices and controllers and interlinked via communications along a data bus, network, or other communication media to perform control loop functions and/or any other desired functions of a process control scheme.

Historically, function blocks have been generally static in nature and, thus, once configured and instantiated within a controller or other process control device, the behavior of or the operations performed by the blocks could not be easily changed. As a result, when upgrading, enhancing, or otherwise changing the operation of a function block, a new function block typically had to be created. To install and use a new function block within a process control system, the process control system, or at least a part thereof, typically had to be taken off-line and reconfigured (e.g., the new function block had to be compiled and downloaded to a controller, field device(s), etc.). Further, in cases where function blocks can include enhancements or capabilities that are not needed, used infrequently, or only temporarily needed in a process control application, it is generally not efficient (e.g., in terms of system resources such as, memory, processor utilization, etc.) to statically instantiate function blocks containing all possible enhancements or capabilities, regardless of whether those enhancements or capabilities are actually needed or how frequently those enhancements or capabilities are used by the devices in which the function blocks are stored and/or instantiated and executed.

SUMMARY

In accordance with one aspect, a process control system, which may control a plurality of field devices, includes an example function block including a base function block adapted to instantiate or delete a dynamic modifier function block. More particularly, an example method of modifying the operation of the function block includes storing the function block in a memory including storing at least one modifiable attribute associated with the base function block in the memory. The example method also includes setting the modifiable attribute to a first value to instantiate a dynamic modifier function block in the memory or a second value to delete a dynamic modifier function block from the memory. Additionally, the example method includes setting the modifiable attribute after the base function block has been compiled and stored in the memory.

In accordance with another aspect, an example function block is stored on a machine readable medium for use in a process control system. The example function block includes a base function block that causes a machine to perform an algorithm associated with the process control system and at least one attribute located within the base function block that causes the machine to delete or instantiate at least one dynamic modifier function block. The dynamic modifier function block is configured to perform an algorithm to change, upgrade, or enhance the capability of the base function block.

In accordance with still another aspect, an example dynamic modifier function block of a function block is adapted to cause a machine to modify a base function block of the function block within a process control routine. The example dynamic modifier function block is instantiated or deleted based on at least one attribute of the base function block. Also, the function block includes an interface to pass data between the base function block and the dynamic modifier function block.

DETAILED DESCRIPTION

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

One approach to providing more flexibility to the manner in which the capabilities or operation of function blocks can be modified, enhanced, extended, upgraded or otherwise changed is described in U.S. Pat. No. 6,510,351, the entire disclosure of which is incorporated herein by reference. As set forth in this patent, the operation or capabilities of a base or original function block can be changed by providing pointers (e.g., memory addresses) within the base function block such that the pointers can be set to cause control to branch to one or more modifier function blocks. In some cases, a base function block may contain multiple pointers to cause branching to different portions (e.g., different algorithms or routines) of a single modifier function block and/or to cause branching to multiple different function blocks. Thus, execution of a base function block may result in branching to a modifier function block, execution of the operations related to that modifier function block, and then return of control to the base function block by the modifier function block. Certain data and/or parameters may be passed between the base and modifier function blocks to enable the modifier function block to perform its operations and/or to change the manner in which the base function block operates or processes information.

However, the above-mentioned modifier function block is not fully dynamic because the modifier function block is created and instantiated when the function block is created and, thus, the local memory required to store the base function block and the modifier function block is consumed. That is, the creation of the function block requires the creation of the modifier function block, whether the enhancements or changes provided by the modifier function block are used or not used. Also, the data exchange of the interface via parameter passing limits the amount of data that can be exchanged and increases the number of cycles and, therefore, the time needed to pass data. Further, the modifier function block does not provide parameters that can be represented outside of the modifier function block because the parameters of the modifier function block are not mapped to those of the base function block.

The dynamic modifier function blocks described herein can be used to change, upgrade, or enhance the capability of another function block, which is referred to herein as a base function block. Also, with the dynamic modifier function blocks described herein, a user has the ability to execute an algorithm associated with the dynamic modifier function block and, further, to instantiate and delete a dynamic modifier function block and data associated with a dynamic modifier function block from local memory. Thus, in contrast to known modifier function blocks, the dynamic modifier function blocks described herein can be instantiated during runtime (e.g., while process control system is online or running) and/or anytime prior to runtime, such as at download. Additionally, the dynamic modifier function blocks can be deleted during runtime or not instantiated prior to runtime.

When using the dynamic modifier function blocks described herein, the base function block typically remains unchanged except that it has the capability to allow a user to instantiate and/or delete dynamic modifier function blocks via one or more attributes in the base function block. In effect, the dynamic modifier function blocks described herein enable a user to change modify, enhance or otherwise change the capability or operation of a base function block by changing an attribute of the base function block, which is typically required for operation of the process control routine and which often must remain instantiated to enable the process control routine to execute. The ability to easily add and/or delete the dynamic modifier function blocks described herein may serve to significantly increase the rate at which advanced control capabilities can be developed for process control systems. Further, a user only has to add overhead to the base function block and use local device memory when the user has a particular application that uses the features provided by the dynamic modifier function block(s). That is, the user or operator can reduce the overhead of the system by not instantiating or deleting an already instantiated dynamic modifier function block when the added functionality provided by the dynamic modifier function block is not needed.

Figure 1:
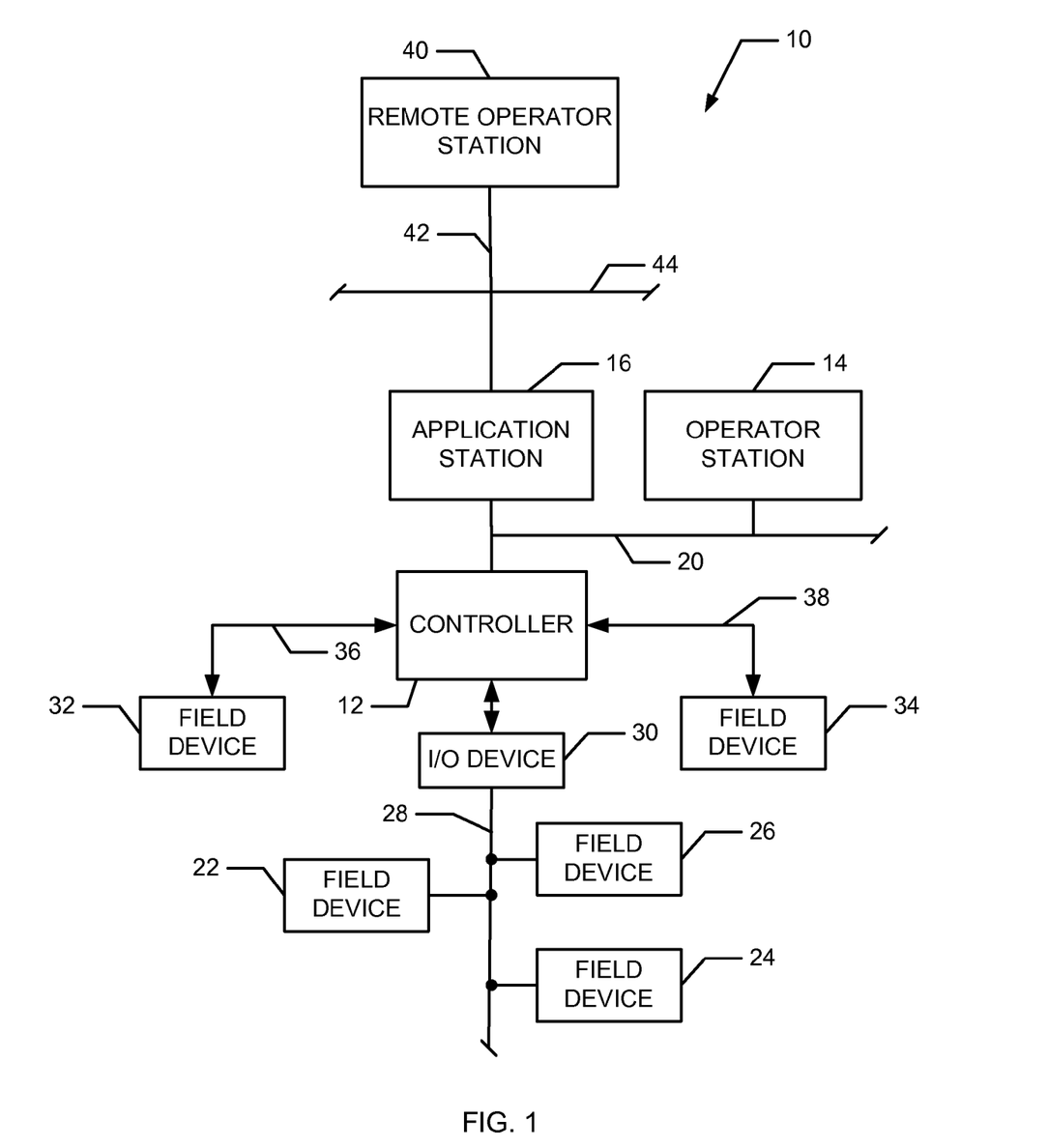
FIG. 1 is a block diagram illustrating an example process control system.

FIG. 1 is a block diagram of an example process control system 10 that uses the dynamic modifier function block apparatus and methods described herein. As shown in FIG. 1, the process control system 10 includes a controller 12, an operator station 14, an active application station 16, and a standby application station 18, all of which may be communicatively coupled via a bus or local area network (LAN) 20, which is commonly referred to as an application control network (ACN). The operator station 14 and the application station 16 may be implemented using one or more workstations or any other suitable computer systems or processing units. For example, the application station 16 could be implemented using single processor personal computers, single or multi-processor workstations, etc. In addition, the LAN 20 may be implemented using any desired communication medium and protocol. For example, the LAN 20 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the application station 16 may be used to provide redundant communication paths between the application station 16 and the controller 12.

The controller 12 may be coupled to a plurality of smart field devices 22, 24 and 26 via a data bus 28 and an input/output (I/O) device 30. The I/O device 30 provides one or more interfaces for the controller 12 and any other device coupled to the data bus 28 (e.g., the smart field devices 22-26, etc.) to collectively communicate with signals sent and received through those interfaces. For example, the I/O device 30 may be implemented by any type of current or future standard interface, such as an external memory interface, serial port, general purpose input/output, or any type of current or future communication device, such as a modem, network interface card, etc. The data bus 28 may be any physical arrangement that provides logical communications functionality, such as, for example, parallel electrical buses with multiple connections, bit-serial connections, both parallel and bit-serial connections, switched hub connections, a multidrop topology, a daisy chain topology, etc.

The smart field devices 22-26 may be Fieldbus compliant valves, actuators, sensors, etc., in which case the smart field devices 22-26 communicate via the data bus 28 using the well-known Fieldbus protocol. Of course, other types of smart field devices and communication protocols could be used instead. For example, the smart field devices 22-26 could instead be Profibus or HART compliant devices that communicate via the data bus 28 using the well-known Profibus and HART communication protocols. Additional I/O devices (similar or identical to the I/O device 30) may be coupled to the controller 12 to enable additional groups of smart field devices, which may be Fieldbus devices, HART devices, etc., to communicate with the controller 12.

The centralized process control routine located within the controller 12 receives inputs from the field devices 22-26, performs calculations and other activities associated with the control routine and sends commands to the field devices 22-26 via the I/O device 30 to implement any desired control of the example process control system 10. Generally, the centralized process control routine performs calculations and other activities associated with the control routine using function blocks. However, the decentralized process control portion of the process control network 10 (i.e., the portion associated with the bus 28 in FIG. 1) may implement its own process control routine in a decentralized manner in conjunction with or instead of the control being performed by the controller 12. Thus, while the controller 12 may interface with and perform some control over the devices 22-26 connected to the bus 28, these devices may also store and execute control functions or function blocks to implement distributed control.

The dynamic modifier function blocks described herein may be used to modify, enhance or otherwise change the capability or operation of any function block or other functional element located in the controller 12, in the I/O device 30, in any of the field devices 22-26 of FIG. 1, or in any other device within the process control system 10. Thus, while dynamic modifier function blocks are described herein as being implemented in the Fieldbus protocol they may, instead, be implemented in any other control or communication protocol including any of those associated with any controller or communication protocol now being used or developed in the future.

In addition to the smart field devices 22-26, one or more non-smart field devices 32 and 34 may be communicatively coupled to the controller 12. The non-smart field devices 32 and 34 may be, for example, conventional 4-20 milliamp (mA) or 0-10 volts direct current (VDC) devices that communicate with the controller 12 via respective hardwired links 36 and 38.

The controller 12 may be, for example, a DeltaV™ controller sold by Fisher-Rosemount Systems, Inc. and Emerson Process Management™. However, any other controller could be used instead. Further, while only one controller in shown in FIG. 1, additional controllers of any desired type or combination of types could be coupled to the LAN 20. In any case, the controller 12 may perform one or more process control routines associated with the process control system 10 that have been generated by a system engineer or other system operator using the operator station 14 and which have been downloaded to and instantiated in the controller 12.

Figure 2:
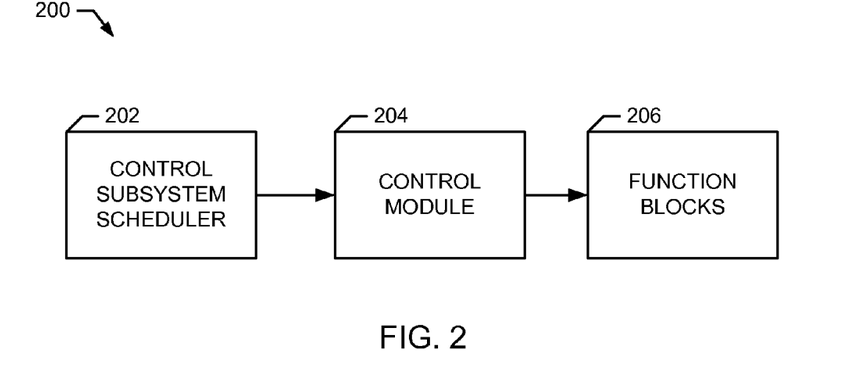
FIG. 2 is a block diagram of an example system that may be used to implement the example apparatus, methods, and articles of manufacture described herein.

FIG. 2 generally depicts an example system 200 that may, for example, be used to implement the example process control system 10 and, more particularly, by the example controller 12 with the I/O device 30, the data bus 28, and the field devices 22-26 of FIG. 1. The example system 200 includes a control subsystem scheduler 202, a control module 204, and function blocks 206. Typically, the control subsystem scheduler 202, which may reside in the example controller 12 of FIG. 1, is implemented as a software application that executes the operations or processes of the control module 204 in a predetermined sequential order along with any other control modules that may be controlled by the control subsystem scheduler 202. For example, the control subsystem scheduler 202 may execute the control module 204 on a control loop. In other words, the control subsystem scheduler 202 controls or coordinates the operation of multiple control modules (not shown) in addition to the control module 204. Control modules typically contain control routines that may be instantiated and executed to perform control functions or activities associated with respective plant areas, equipment, etc. More specifically, the control modules 204 may be associated with one or more pieces of physical equipment or devices and, thus, may be used to monitor and/or control that equipment or devices (e.g., the field devices 22-26 of FIG. 2).

Also, the control module 204 may be composed of further objects and sub-objects. However, for purposes of discussion, such objects and sub-objects are described below only in connection with the control module 204. The control module 204 is made up of communicatively interconnected function blocks 206, which are objects in an object-oriented programming protocol that perform functions within the control scheme based on inputs and provide outputs to other function blocks within the control scheme. The control module 204 may be dedicated to a controller (e.g., the controller 12 of FIG. 1) and, in some cases, a field device (e.g., field devices 22-26 of FIG. 1) may store and execute the control module 204 or a portion thereof.

The control module 204 and its function blocks 206 may be associated with one or more attributes that may be parameters such as, for example, input variables, output variables, or the like that are associated with the physical and/or control conditions within a process control subsystem. Also, each of the function blocks 206 may be associated with one or more attributes. The function blocks 206, as described in detail below, may each contain one or more mathematical functions (e.g., summation operations, multiplication operations, division operations, etc.), logical functions, expressions (e.g., logical OR, AND, etc.), control functions, interfaces, tuning functions, or any other desired functions within a process control system.

The function blocks 206 are composed of software and/or any other type of logic to process input parameters according to a specified algorithm and an internal set of control parameters. In this manner, each of the function blocks 206 may produce output parameters that are available for use by the control module 204, other function blocks, or any other software, programmable device, etc. communicatively coupled to the function blocks 206. In particular, the input parameters of one of the function blocks 206 may be linked to the output parameters of one or more other ones of the function blocks 206 or other function blocks outside of the control module 204 and the control subsystem scheduler 202. The parameters associated with the function blocks 206 may pertain to the entire application process (e.g., manufacturing ID, device type, etc.), encapsulate control functions (e.g., PID controller, analog input, etc.), and/or may represent an interface to sensors such as temperature sensors, pressure sensors, flow sensors, etc.

Each of the function blocks 206 is identified by a unique tag that may be assigned by a user. Additionally, the parameters of each function block are represented by object descriptions that define how the parameters are communicated throughout the process control system. Thus, many parameters in the system are uniquely identified by reference to their tag (i.e., the tag for the function block associated with the parameter) and parameter name. During runtime, after the function block is executed using the corresponding input values, its outputs (i.e., output values) are updated and then broadcast to other function blocks 206 and/or any other device of the process control system that reads (e.g., subscribes or binds to) the these outputs. The function blocks 206 may reside inside the same field device and/or in different devices of the process control system.

Typically, using known technologies, a modification or change to the algorithm of any of the function blocks 206 may require the example system 200 to be updated by, for example, stopping the control subsystem scheduler 202, which then ceases calls to the control module 204, and any other control modules called or invoked by the control subsystem scheduler 202. Then, a user can modify one or more of the function blocks 206 to change the respective algorithms of the one or more function blocks 206. However, with the dynamic modifier function blocks described herein, a user can create an algorithm to modify, enhance or otherwise change the capability or operation of one or more of the function blocks 206 and instantiate the algorithm of the dynamic modifier function block(s) during runtime. Thus, the dynamic modifier function blocks described herein enable the system 200 to be updated or modified without stopping the control subsystem scheduler 202. As a result, calls to the control module 204 and any other control modules called by the control subsystem scheduler 202 do not have to be ceased. Accordingly, the dynamic modifier function blocks described herein enable modifications to the example system 200, which may otherwise have required outages or other such termination of the operations of field devices and/or process control systems. Accordingly, the dynamic modifier function blocks described herein prevent such outages or terminations, which may entail significant production costs and time, while allowing modification, enhancements or other changes to the capability or operation of a process control system.

Figure 3:
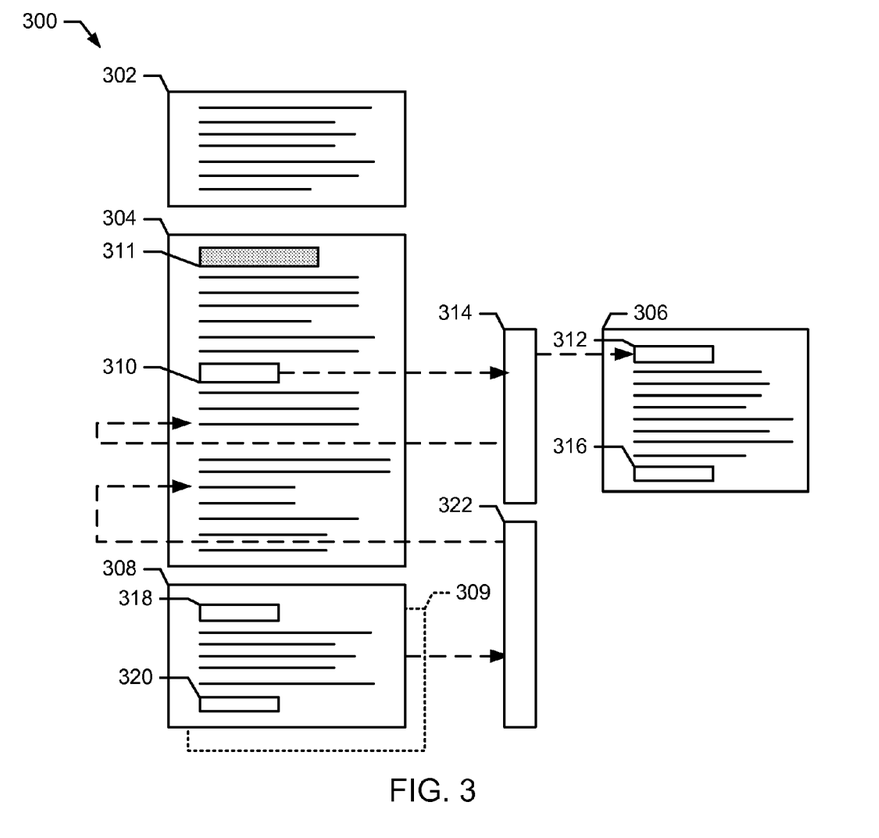
FIG. 3 is a block diagram of an example function block that includes an example base function block, a modifier function block, and dynamic modifier function blocks.

FIG. 3 shows an example function block 300 that includes an example function block definition 302, an example base function block 304, an example modifier function block 306, and example dynamic modifier function blocks 308 and 309. The example function block definition 302 provides definitions and attributes to create the example function block 300 and, in particular, allocates the data for the example base function block 304, the example modifier function block 306, and the example dynamic modifier function blocks 308 and 309. As discussed in detail below in connection with FIG. 4, the example function block definition 302 is created at download (e.g., downloaded to a field device) to allocate memory and index objects (e.g., the example base function block 304, the example modifier function block 306, and the example dynamic modifier function blocks 308 and 309). As shown, the example function block definition 302 is created to instantiate the definition and the object data (e.g., algorithm and data block) that enables the execution of the example base function block 304 and the example modifier function block 306. Also, the example function block definition 302 is created at download to instantiate the definitions for the dynamic modifier function blocks 308 and 309, but only the object data (e.g., algorithm and data block) that enables the execution of the example dynamic modifier function block 308 and not the data block for the dynamic modifier function block 309.

As is known, the modifier function block 306 can be used to change, upgrade, or enhance the capability of the base function block 304. The base function block 304 includes a software routine or algorithm, which has one or more sets of instructions to be executed by a processor within a field device, controller, etc. Also, the base function block 304 includes one or more data blocks stored in local memory that may be input data provided to the algorithm or output data produced by the algorithm associated with the base function block 304. Additionally, the base function block 304 includes a branching point 310 that is used to conditionally implement some enhanced capability provided by the modifier function block 306, which has an algorithm made up of a series of instructions and data stored in local memory.

The branching point 310 is generally created in the base function block 304 when the function block 300 is created and may be updated after the base function block 304 is compiled. The contents of the branching point 310 are set to include a pointer to an entry point 312 of the algorithm on the modifier function block 306 or to the next line of code of the algorithm on the base function block 304. Thus, a user can change the value of the pointer, to enable/disable execution of one or more algorithms associated with the modifier function block 306 to thereby change, upgrade, or enhance the capability of the base function block 304. The pointer at the branching point 310 may be an address indicating the address of the modifier function block 306 in memory, the address of some part of the algorithm of the modifier function block 306, the name or other identifier of the modifier function block 306, or may be any other handle or branching device used to pass control to the modifier function block 306.

When control is passed to the modifier function block 306, certain predefined data is sent or made available to the modifier function block 306, and the modifier function block 306 uses or changes this data during execution of its algorithm(s). The data may be provided through a fixed or predefined interface 314, which typically includes parameters and/or data values for use by the modifier function block 306, where to return control within the base function block 304, and/or any other data or information needed for the execution of the algorithm of the modifier function block 306 to take control, execute, and return control to the base function block 304.

The interface 314 may be implemented as a predefined section of memory within a device, may be provided within the base function block 304 or the modifier function block 306, or may be provided in any other manner. After, the modifier function block 306 implements the algorithm acting on the data provided via the interface 314, a return instruction 316 returns control to a predetermined point in the algorithm of the base function block 304, which may be an instruction immediately following the branching point 310 or may be defined in some manner by the interface 314 to be some other location of the algorithm on the base function block 304. The return instruction 316 may be any desired type of return instruction, such as a GOTO or an END LOOP instruction, and/or may take on any other form depending on the type of code used in the modifier function block 306. Also, the modifier function block 306 returns certain data via the interface 314, which may be the same or a different interface than that used to send control and/or data to the modifier function block 306.

Because the base function block 304 and the modifier function block 306 are created together when the function block 300 is created, the local memory required to store the modifier function block 306 is consumed, whether the functionality of the modifier function block 306 is used or not used. In other words, the creation of the function block 300 requires the creation of the modifier function block 306. Also, data exchange through the interface 314 via parameter passing limits the amount of data that can be exchanged and increases the number of cycles and, therefore, the time needed to pass data. Further, the modifier function block 306 does not provide parameters that can be represented outside of the modifier function block 306 because the parameters of the modifier function block 306 are not mapped to those of the base function block 304.

In contrast to the modifier function block 306, the dynamic modifier function blocks 308 and 309 can be used to dynamically change, upgrade, or enhance the capability of the base function block 304. More specifically, employing the dynamic modifier function blocks 308 and 309, a user has the ability to instantiate/delete the dynamic modifier function block algorithm(s) and data blocks associated with the algorithm(s) from local memory (e.g., delete the dynamic modifier function block 308 and instantiate the dynamic modifier function block 309). In contrast to the modifier function block 306, the dynamic modifier function block 309 can be instantiated during runtime and/or anytime prior to runtime, such as at download. Similarly, the dynamic modifier function block 308 can be deleted during runtime or not instantiated prior to runtime. While only the dynamic modifier function blocks 308 and 309 are shown, any number of dynamic modifier function blocks may be implemented on the function block 300. As shown, the dynamic modifier function block 308 executes outside of the execution of the base function block 304. In particular, the dynamic modifier function block 308 may execute before and/or after the execution of the base function block 304. When instantiated, the dynamic modifier function blocks 308 and 309 each have an algorithm made up of a series of instructions and data blocks in local memory to change, upgrade, or enhance the capability of the base function block 304. Also when instantiated, the dynamic modifier function block 309 may execute before and/or after the execution of the base function block 304 and/or the dynamic modifier function block 308.

As shown, the base function block 304 includes one or more attribute(s) 311, which are configured to be write checked to instantiate and/or delete the dynamic modifier function blocks 308 and 309. As discussed below in connection with FIG. 4, the attribute(s) 311 are mapped to the function block definition 302 and, in particular, the definitions to instantiate and/or delete the dynamic modifier function blocks 308 and 309. For example, a user can instantiate the dynamic modifier function block 309 by changing the attribute(s) 311 of the base function block 304, which are then write checked during execution of the base function block 304. Similarly, a user can delete the dynamic modifier function block 308 by changing the attribute(s) 311, which are then write checked during execution of the base function block 304. In the example of FIG. 3, the dynamic modifier function block 308 is enabled by the attribute(s) 311 and, therefore the control module (e.g., the control module 204 of FIG. 2) schedules the execution of the dynamic modifier function block 308. If no change is made to the attribute(s) 311, the write check of the base function block 304 enables the continued execution of the base function block 304.

The dynamic modifier function block 308 includes an entry point 318, which is stored in the function block definition 302 after instantiation of the dynamic modifier function block 308. The entry point 318 is stored in the function block definition 302 as a pointer, which may be an address indicating the address of the dynamic modifier function block 308 in memory, the address of some part of the algorithm of the dynamic modifier function block 308, the name or other identifier of the dynamic modifier function block 308, or may be any other handle or branching device used to pass control to the dynamic modifier function block 308. Thus, a scheduler (e.g., the control subsystem scheduler 202 of FIG. 2) calls the execution of the algorithm of the dynamic modifier function block 308 at the entry point 318. When the dynamic modifier function block 308 implements its algorithm, an instruction 320 returns control to the scheduler. The instruction 320 may be any desired type of instruction to end a block of instructions and/or may take on any other form depending on the type of code used in the dynamic modifier function blocks 308 and 309. Thus, the dynamic modifier function block 308 is called or invoked by the scheduler outside the execution of the base function block 304.

As is also shown in FIG. 3, the function block 300 includes interface(s) 322 that can be used to exchange data between the base function block 304 and the dynamic modifier function block 308 (and/or the dynamic modifier function block 309). The interface(s) 322 may be multiple interfaces such as, for example, a write interface to write data to the base function block 304 and a separate read interface to read data from the base function block 304. The interface(s) 322 may be implemented as a registered callback to write to data objects on the base function block 304. For example, the dynamic modifier function block 308 may pass an attribute and/or a data pointer to the interface(s) 322 to cause the registered callback to write to the base function block 304. Similarly, the dynamic modifier function block 309, when instantiated, may pass an attribute and/or a data pointer to the interface(s) 322 to call the registered callback to write to the base function block 304. The interface(s) 322 may also provide an address indicating the address of data objects in memory of the base function block 304, an index to an address of data objects in memory of the base function block 304, or may be any other implementation to read and/or write data objects between function blocks.

Although the dynamic modifier function block 308 is shown with a single entry point 318 and a single return instruction 320, the dynamic modifier function blocks may begin execution and/or return control at a number of points in the algorithm of the dynamic modifier function block 308. For example, the entry point 318 and the return instruction 320 may be set to call different parts or subroutines of the algorithm within the dynamic modifier function block 308 to thereby provide different enhancements to the algorithm associated with the base function block 304.

It will be apparent that the dynamic modifier function blocks 308 and 309 described herein can be used for any purpose or in any manner to change, modify or upgrade a base function block 304, to provide enhanced capabilities for any type of base function block 304 (e.g., an input, output or control function block) either at all times or at selected times. Thus, for example, a dynamic modifier function block (e.g., the dynamic modifier function blocks 308 and 309) may be used to implement adaptive gain, gain scheduling, dead time compensation, etc. in a base function block 304, or to provide any other enhanced or modified capability to a base function block 304. Also, when the dynamic modifier function blocks 308 and 309 are communicatively coupled with a user interface, the user interface may automatically show one or more attributes associated with the dynamic modifier function block 309 after instantiation. Conversely, the user interface may automatically remove one or more attributes associated with the dynamic modifier function block 308 after deletion.

Likewise, it will be understood that the base function block 304 and the dynamic modifier function blocks 308 and 309 may be stored in any memory or memories of a device or within any memory or memories associated with a processor executing these function blocks, such as in random-access memory ("RAM"), read-only memory ("ROM"), erasable programmable read-only memory ("EPROM"), or electrically erasable programmable read-only memory ("EEPROM"), on a hard drive, on a disc drive, or in any other suitable memory accessible by a processor. Likewise, these function blocks may be sold or otherwise provided to a user stored in any desired type of memory, such as a magnetic disc, an optical disc (e.g., a compact or laser disc), a magnetic or optical tape or any other computer readable storage medium. Also, the base and dynamic modifier function blocks described herein may be provided to a user as a single unit (e.g. stored in the same memory) or as separate units (e.g., stored in separate memories) at the same or at different times.

Function blocks generally include wrapper descriptors that form a set rules and properties (e.g., names, IDs, interface entry points, flags, default values, etc.), which may, for example, be used to instantiate the function block definition 302 of FIG. 3. The wrapper descriptors are shared between runtime control and the base function block to provide the same relationships for interpretation and user configuration. In particular, a controller may use these wrapper descriptors to parse download scripts and service control objects. Also, each attribute of the function block is defined with a unique attribute ID (e.g., an integer value). For a base function block with a dynamic modifier function block, the dynamic modifier function block is controlled by a particular attribute (e.g., the attribute(s) 311 of FIG. 3), and therefore is associated with a particular attribute ID.

Figure 4:
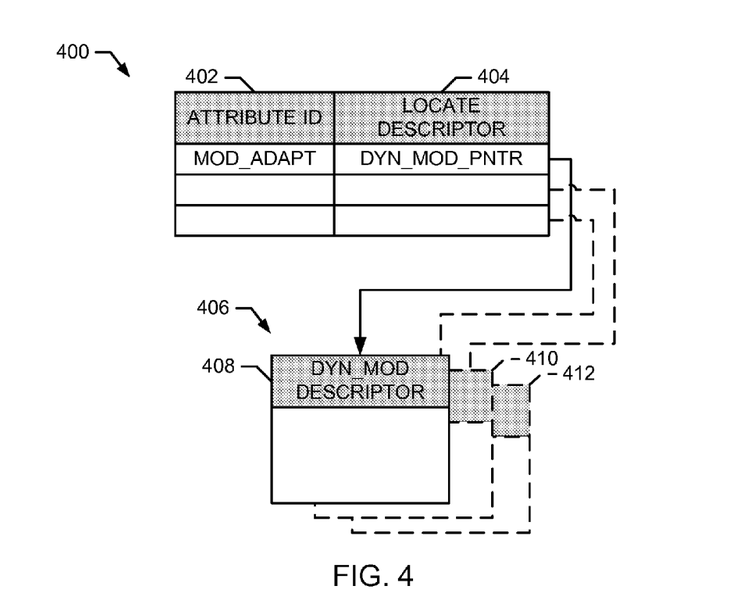
FIG. 4 is a block diagram of an example dynamic modifier function block mapping table.

FIG. 4 shows an example dynamic modifier function block mapping table 400 to associate attribute(s) 402 of a base function block with pointers 404 to dynamic modifier function block descriptors 406, which may, for example, be located in the example function block definition 302 of FIG. 2. The example dynamic modifier function block mapping table 400 includes an attribute identifier "MOD_ADAPT" that is associated with a pointer "DYN_MOD_PNTR" to the descriptor of a particular dynamic modifier function block 408 of dynamic modifier function block descriptors 406. Although shown textually, persons of ordinary skill in the art will understand that such textual descriptions can alternatively or additionally be implemented by addresses, codes, and/or other designations. Thus, a write check to the attribute "MOD_ADAPT" can individually map to the respective dynamic modifier function block descriptors 408, 410, and 412 associated with a plurality of dynamic modifier function blocks. For example, another pointer associated with a second dynamic modifier function block may be stored in the dynamic modifier function block mapping table 400 and associated with the attribute identifier "MOD_ADAPT" to locate the dynamic modifier function block descriptor 410.

Figure 5:
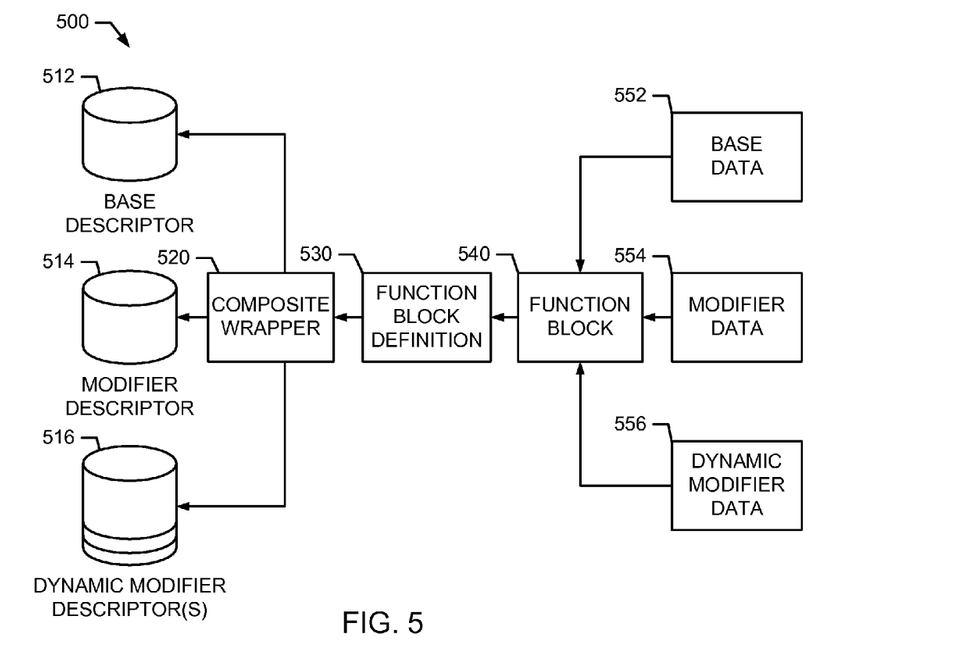
FIG. 5 is a block diagram of an example instantiation of a function block having a dynamic modifier function block.

FIG. 5 shows an example function block instantiation 500 during download to a device (e.g., creating an instance of the objects associated with the function block in local memory), wherein the function block definition object 540 (e.g., the function block definition 302 of FIG. 3) and the function block object (e.g., base function block 304, the modifier function block 306, and the dynamic modifier function block 308 of FIG. 3) are instantiated. In the example function block download instantiation 500, the arrows indicate the building relationship of the example function block instantiation 500 (i.e., the arrow points to the defining object). Thus, as shown in FIG. 5, the base function block wrapper descriptor 512 provides a set of rules and properties for the base function block, the modifier function block wrapper descriptor 514 provides a set of rules and properties for the modifier function block, and the dynamic modifier function block wrapper descriptor(s) 516 provides a set of rules and properties for the dynamic modifier function block(s) (e.g., the blocks 308 and 309 of FIG. 3). From the respective wrapper descriptors 512-516, the example function block instantiation 500 counts the attributes and locally caches properties to create the composite wrapper definition 520. The example composite wrapper 520 provides a user a list of dynamic modifier function blocks associated with the dynamic modifier function block wrapper descriptor(s) 516 to instantiate (e.g., the dynamic modifier function blocks 308 and 309 of FIG. 3). From the composite wrapper 520, the function block definition 530 is built, which provides the attributes of the function blocks. The function block definition 530 defines the memory space to allocate for subblock data such as base function block data 552 and modifier function block data 554. In the instance of the modifier function block data 554, the function block definition 530 defines memory space for subblock data, such as the modifier function block data 554.

For the example function block instantiation 500, the function block definition 530 includes an attribute having a value defined by a user prior to download, which determines whether dynamic modifier function block data 556 is to be instantiated. Thus, memory space is not unnecessarily consumed at download when a user does not desire the enhancements or changes provided by the algorithm of the dynamic modifier function block. As discussed above, the definition of the dynamic modifier function block is instantiated, but the memory for the dynamic modifier function block data 556 is not. Thus, the user can change the value of the attribute on the function block definition 530 to instantiate the dynamic modifier function block at runtime or any time from download to runtime.

After instantiation of a function block with a dynamic modifier function block, initialization call(s) on the function block store variables with specific starting values, which may be determined from a download script and/or copied from one or more attributes provided in the wrapper descriptors 512-516. Additionally, the initialization may be performed directly to a controller (e.g., the controller 12 of FIG. 1), which may not require a separate configuration database. The interface of the attributes of the function block is also initiated (e.g., interface(s) 322 of FIG. 3), wherein the interface may use a registered call back function to exchange data between a dynamic modifier function block and a base function block, as discussed above in connection with FIG. 3.

Figure 6:
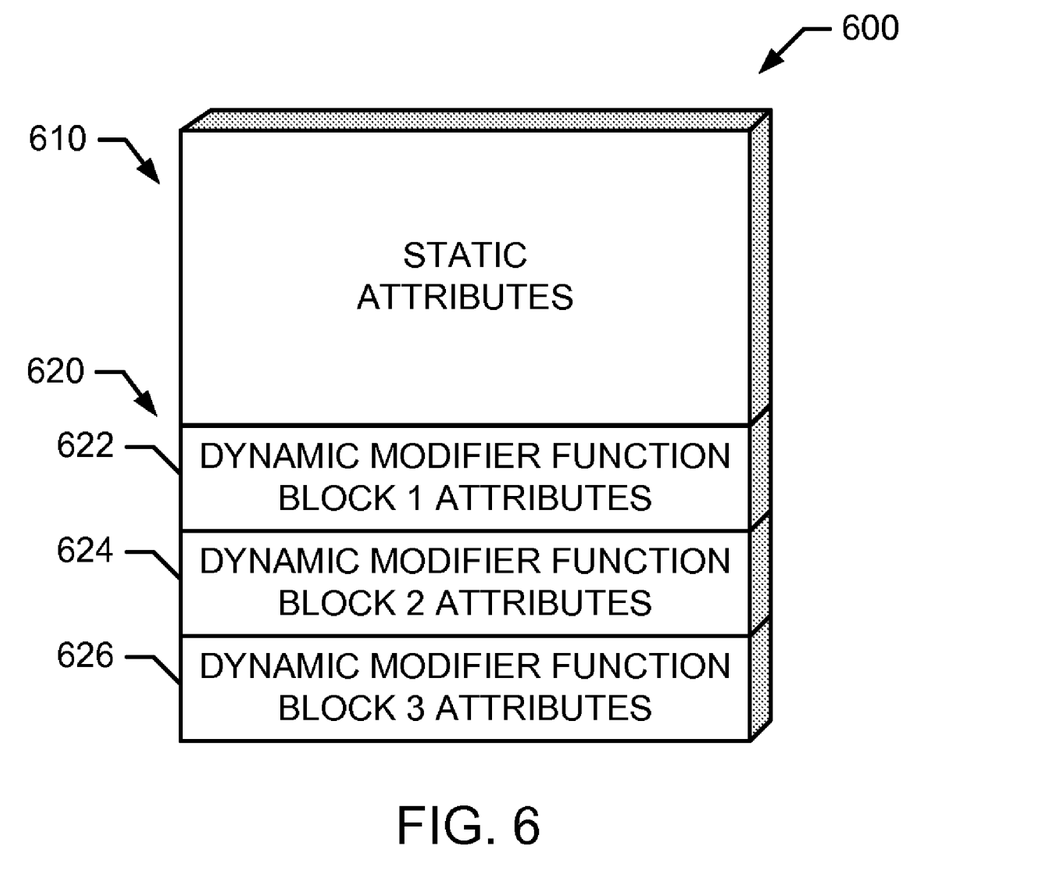
FIG. 6 is a block diagram of an example name space and index of a function block having a dynamic modifier function block.

FIG. 6 shows an example name space 600 of a function block with three dynamic modifier function blocks enabled. The example name space 600 includes a static sector 610 that holds the attributes enabled during instantiation (e.g., attributes associated with the base function block and the modifier function block) and a dynamic sector 620 that holds the attributes for a first dynamic modifier function block 622, a second dynamic modifier function block 624, and a third dynamic modifier function block 626. As discussed above, a user can instantiate or delete any one of the dynamic modifier function blocks associated with the attributes 622-626 and, thus, the dynamic attribute sector 620 may change. When the dynamic attribute sector 620 changes, the indices (e.g., the index from a particular address) in the dynamic sector 620 may become invalid. For example, a user may delete the first and second dynamic modifier function blocks, which removes the respective attributes 622 and 624 of the first dynamic modifier function block and the second dynamic modifier function block 624 and moves the attributes for the third dynamic modifier function block 626 up in the example name space 600.

When the name space of a function block changes with the instantiation of a dynamic modifier function block, the execution and/or instantiation of a function block with a dynamic modifier function block creates a key mechanism to map any attributes of the dynamic modifier function block that may be mapped by a client (e.g., other function blocks). Generally, access to an attribute on a function block from a client is mapped by an address in name space and an index.

As described above in connection with FIG. 6, the name space of a function block changes with the enabling or disabling of any dynamic modifier function block. Therefore, to prevent invalid references to an attribute, a key mechanism is provided, which may be located on a control module (e.g., the control module 204 of FIG. 2). The key mechanism stores one or more keys (e.g., a pointer value, an index value, an address location, a unique value, or any combination thereof) for respective dynamic modifier function block(s) that are transferred to client(s) when the client(s) bind to an attribute on the dynamic sector (e.g., the dynamic sector 620) of the function block. When a dynamic modifier function block is instantiated or deleted, the function block associated with the dynamic modifier function block updates the key(s) in the key mechanism. Thus, when a client accesses an attribute on the function block and, in particular, an attribute associated with a dynamic modifier function block, the client compares the key from the last access with the current key in the table. When the binding key and current key match, the client is granted access. Alternatively, when the binding key does not match, the client must rebind to the attribute.

Of course, dynamic modifier function blocks can be implemented using any external process control communication protocol (besides the Fieldbus protocol) and may be used to communicate with any type of function block including any function block that is similar to or the same as any of the different function blocks specifically identified by and supported by the Fieldbus protocol. Moreover, while the dynamic modifier function block in one embodiment hereof is a Fieldbus "function block," it is noted that the use of the expression "function block" herein is not limited to what the Fieldbus protocol identifies as a function block but, instead, includes any other type of block, program, hardware, firmware, etc., associated with any type of control system and/or communication protocol that can be used to implement some process control routine function and that has a predefined setup or protocol for providing information or data to other such function blocks. Thus, while function blocks typically take the form of objects within an object-oriented programming environment, this need not be case and can, instead, be other logical units used to perform particular control (including input and output) functions within a process control environment.

Figure 7:
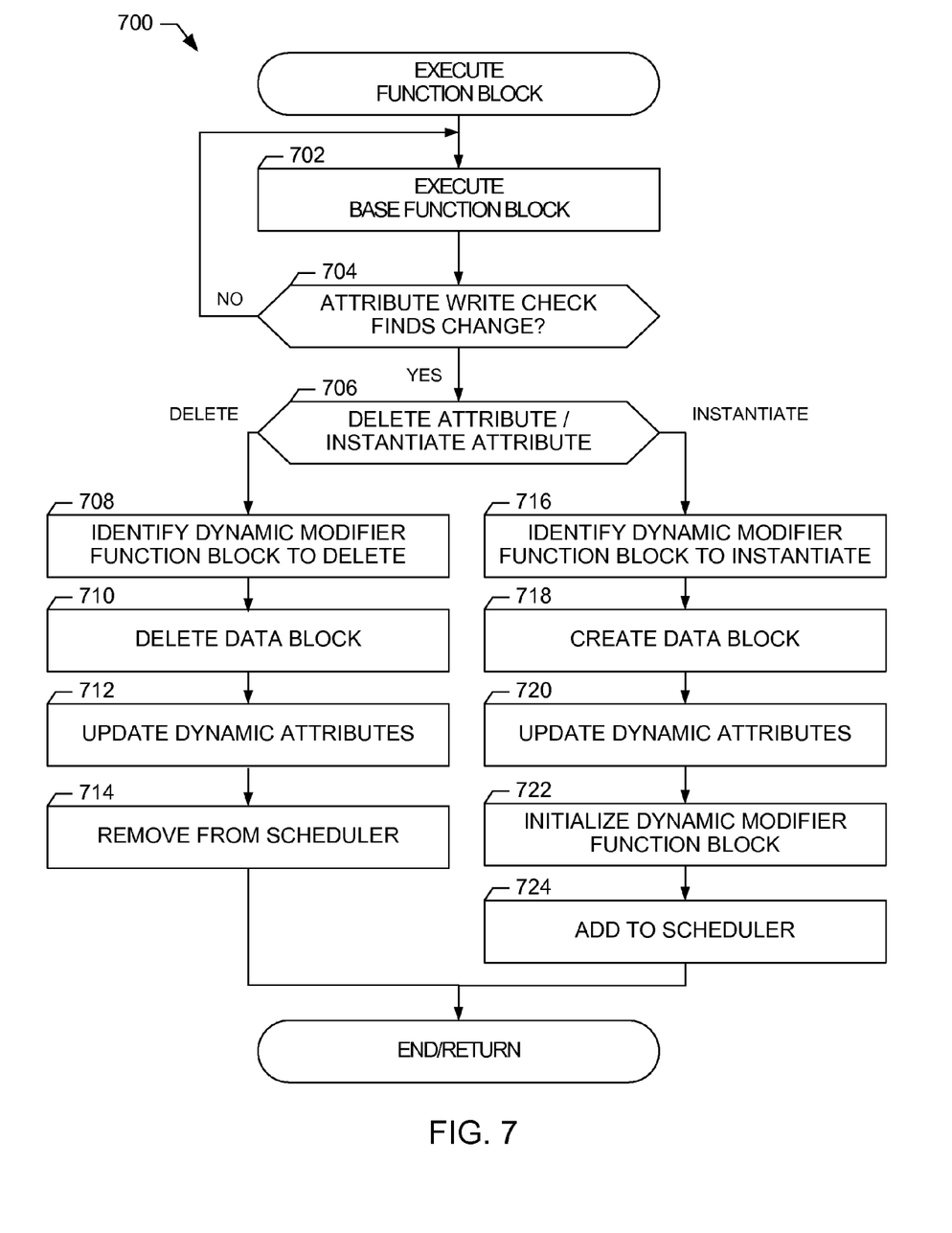
FIG. 7 is a flowchart of an example process that may be used to instantiate and/or delete the dynamic modifier function blocks described herein.

FIG. 7 is a flowchart depicting an example process 700 to delete and/or instantiate a dynamic modifier function block during runtime such as, for example, the dynamic modifier function blocks 308 and 309 of FIG. 3. The operations described in connection with the process depicted in FIG. 7, may be implemented using machine readable instructions, code, software, etc., which may be stored and accessed on a computer readable medium. Such a computer readable medium includes, but is not limited to optical storage devices, magnetic storage devices, non-volatile solid-state memory, and volatile solid-state memory. Further, some or all of the operations may be performed manually and/or the order of the operations may be changed and/or some of the operations may be modified or eliminated. Similarly, some or all of the operations of each block can be performed iteratively. The operations depicted in FIG. 7 may be performed by the example controller 12 and/or the field devices 22-26 of FIG. 1.

The example process 700 begins by executing an algorithm on a base function block (e.g., the base function block 304 of FIG. 3) (block 702). During the execution of the base function block in block 702, a write check is executed on particular attribute(s) of the base function block to determine whether to proceed with instantiating or deleting a dynamic modifier function block (block 704). If the write check determines there is no change of the attribute(s) of the base function block (block 704), the example process 700 returns to block 702 and continues execution of the base function block. If the write check determines a change of the attribute(s) of the base function block (block 704), the example process 700 determines either to instantiate a new or delete an existing dynamic modifier function block (block 706).

If the example process 700 determines (at block 706) via a particular change to the attribute(s) of the base function block (e.g., a particular change to a Boolean variable, a flag value, or any other attribute to indicate a logic status change) to delete an existing dynamic modifier function block in block 706, the example process 700 identifies the dynamic modifier function block to be deleted by using, for example, a unique attribute ID and/or a pointer to an index (block 708). After identifying the dynamic modifier function block to delete, the example process 700 deletes the data block associated with the identified dynamic modifier function block from memory (block 710). The example process 700 proceeds to update the attributes in the dynamic attribute space by removing the attributes associated with the deleted dynamic modifier function block and updating the keys in the key mechanism associated with the attribute(s) which, in turn, are associated with the deleted dynamic modifier function block (block 712). The example process 700 then removes the execution of the deleted dynamic modifier function block from the scheduler (block 714) and ends the execution of the process 700 and/or returns control to a calling process.

If the example process 700 determines via a particular change to the attribute(s) of the base function block (e.g., a particular change to a Boolean variable, a flag value, or any other attribute to indicate a logic status change) to instantiate a new dynamic modifier function block (block 706), the example process 700 identifies the dynamic modifier function block to be instantiated by using, for example, a unique attribute ID and/or a pointer to an index (block 716). After identifying the dynamic modifier function block to instantiate in block 716, the example process 700 creates the data block in memory associated with the identified dynamic modifier function block (block 718). The example process 700 proceeds to update the attributes in the dynamic attribute space by adding the attributes associated with the instantiated dynamic modifier function block and updating the keys in the key mechanism associated with the attribute(s) associated with the instantiated dynamic modifier function block (block 720). The example process 700 then initializes any variables associated with the dynamic modifier function block (block 722). Also, the example process 700 adds the execution of the instantiated dynamic modifier function block to the scheduler (block 724) and ends the execution of the process 700 and/or returns control to a calling process.

Figure 8:
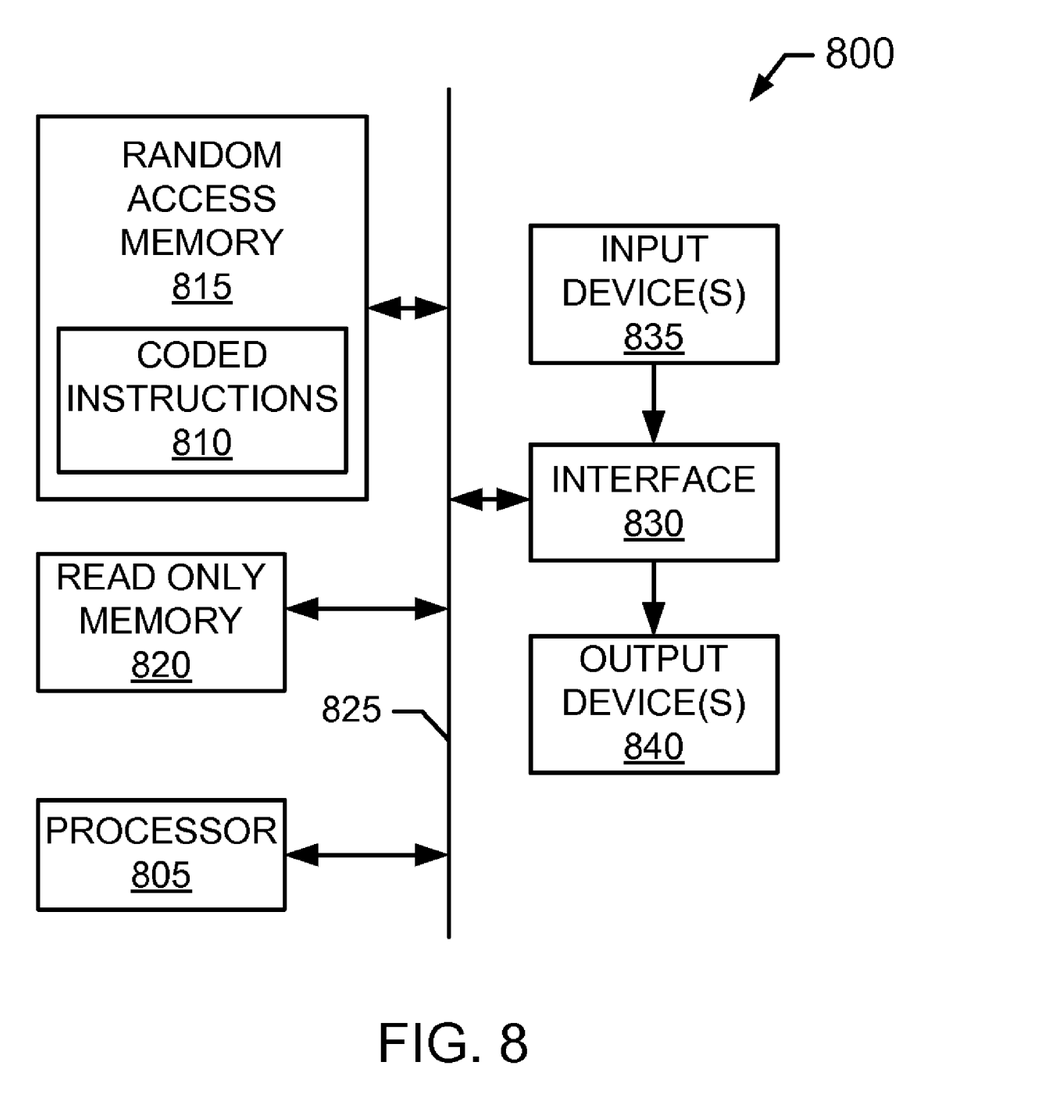
FIG. 8 is a schematic illustration of an example processing system that may be used to implement the methods and apparatus described herein.

FIG. 8 is a schematic diagram of an example processor platform 800 that may be used and/or programmed to implement the example controller 12, the field devices 22-26, and/or the application station 16 of FIG. 1. For example, the processor platform 800 can be implemented by one or more general purpose single-thread and/or multi-threaded processors, cores, microcontrollers, etc. The processor platform 800 may also be implemented by one or more computing devices that contain any of a variety of concurrently-executing single-thread and/or multi-threaded processors, cores, microcontrollers, etc.

The processor platform 800 of the example of FIG. 8 includes at least one general purpose programmable processor 805. The processor 805 executes coded instructions 810 present in main memory of the processor 805 (e.g., within a RAM 815). The coded instructions 810 may be used to implement the operations represented the example processes described in connection with FIGS. 2, 3, 4, and 7. The processor 805 may be any type of processing unit, such as a processor core, processor and/or microcontroller. The processor 805 is in communication with the main memory (including a ROM 820 and the RAM 815) via a bus 825. The RAM 815 may be implemented by dynamic random-access memory ("DRAM"), synchronous random-access memory ("SDRAM"), and/or any other type of RAM device, and ROM may be implemented by flash memory and/or any other desired type of memory device. Access to the memory 815 and 820 may be controlled by a memory controller (not shown). The main memory (including the ROM 820 and the RAM 815) may be used to store the example processes, attributes, and other such storable data associated with FIGS. 2-7.

The processor platform 800 also includes an interface circuit 830. The interface circuit 830 may be implemented by any type of interface standard, such as an external memory interface, serial port, general purpose input/output, etc. One or more input devices 835 and one or more output devices 840 are connected to the interface circuit 830.

At least some of the above described example methods and/or apparatus are implemented by one or more software and/or firmware programs running on a processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be used to implement the example methods and/or apparatus described herein.

It should also be noted that the example software and/or firmware implementations described herein may be stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of modifying an operation of a function block including a base function block adapted to instantiate or delete a dynamic modifier function block, the method comprising:
storing the function block in a memory of a machine; and
storing at least one modifiable attribute associated with the base function block in the memory, wherein the modifiable attribute can be set to a first value to cause the machine to instantiate a dynamic modifier function block in the memory or a second value to cause the machine to delete a dynamic modifier function block from the memory.

2. The method of claim 1, wherein the function block is associated with a process control system that performs a process control routine using a multiplicity of communicatively coupled function blocks.

3. The method of claim 2, wherein each of the multiplicity of communicatively coupled function blocks provides at least one output signal to one or more other ones of the multiplicity of communicatively coupled function blocks, and receives at least one input signal from one or more other ones of the multiplicity of communicatively coupled function blocks.

4. The method of claim 1, wherein the dynamic modifier function block comprises a series of machine readable instructions stored on a machine readable medium that, when executed, cause the machine to perform an algorithm associated with a process control system.

5. The method of claim 4, wherein the algorithm is at least one of a control function, an auto-tuning function, or an interface function.

6. The method of claim 1, wherein instantiating the dynamic modifier function block comprises scheduling the machine to execute a set of machine readable instructions associated with the dynamic modifier block before or after executing a set of machine readable instructions associated with the base function block.

7. The method of claim 1, wherein the modifiable attribute can be set to a third value to cause the machine to perform an algorithm associated with the base function block.

8. The method of claim 1, wherein the machine comprises a processor located in a field device.

9. The method of claim 1, wherein the machine is to perform a write check function to identify the first value or the second value of the modifiable attribute.

10. The method of claim 1, wherein the modifiable attribute can be set to the first value or the second value after the base function block has been compiled and stored in the memory.

11. The method of claim 1 further comprising setting the modifiable attribute to a third value by the machine after the machine deletes the dynamic modifier function block from memory or instantiates the dynamic modifier function block in the memory, wherein the third value causes the machine to perform an algorithm associated with a process control system.

12. The method of claim 1 further comprising changing the modifiable attribute from the first value to the second value when the base function block is operating within a process control routine to alter the process control routine.

13. The method of claim 1, wherein storing the function block in the memory comprises instantiating a dynamic modifier function block.

14. The method of claim 13, wherein instantiating the dynamic modifier function block comprises scheduling the machine to execute a series of machine readable instructions associated with the dynamic modifier block before or after a series of machine readable instructions associated with the base function block.

15. A function block stored on a machine readable medium for use in a process control system comprising:
a base function block having a first series of machine readable instructions stored on the machine readable medium that, when executed, cause a machine to perform an algorithm associated with the process control system; and
at least one attribute located within the first series of machine readable instructions, wherein the attribute causes the machine to perform at least one of deleting or instantiating at least one dynamic modifier function block.

16. The function block of claim 15, wherein the dynamic modifier function block comprises a second series of machine readable instructions stored on the machine readable medium that, when executed, cause the machine to perform a second algorithm associated with the process control system.

17. The function block of claim 16, wherein the second algorithm is at least one of a control function, an auto-tuning function, or an interface function.

18. The function block of claim 15, wherein the process control system performs a process control routine using a multiplicity of communicatively interconnected function blocks.

19. The function block of claim 18, wherein each of the multiplicity of communicatively interconnected function blocks provides at least one output signal to one or more other ones of the multiplicity of communicatively interconnected function blocks, and receives at least one input signal from one or more other ones of the multiplicity of communicatively interconnected function blocks.

20. The function block of claim 15 further comprising an interface to pass data between the base function block and the at least one dynamic modifier function block.

21. The function block of claim 20, wherein the interface comprises a registered callback function to write data values to the base function block.

22. The function block of claim 20, wherein the interface comprises data values to be read by the at least one dynamic modifier function block.

23. The function block of claim 20, wherein the interface includes memory address values associated with data values to be read by the at least one dynamic modifier function block.

24. The function block of claim 15, wherein the attribute further causes the machine to perform the algorithm associated with the process control system without instantiating or deleting the dynamic modifier function block.

25. The function block of claim 15, wherein the at least one attribute is modifiable after the base function block has been compiled and stored in a machine readable memory associated with the machine.

26. The function block of claim 15, wherein the machine comprises a processor located in a field device having memory to store the machine readable instructions.

27. The function block of claim 15, wherein the function block includes machine readable instruction that, when executed, cause the machine to perform a write check function to identify the value of the at least one attribute.

28. The function block of claim 15, wherein the function block includes machine readable instruction that, when executed, cause the machine to modify keys associated with respective attributes of the at least one dynamic modifier function block after deleting or instantiating the at least one dynamic modifier function block.

29. The function block of claim 28, wherein the respective ones of the keys comprise at least a portion of at least one of an index value or a memory address.

30. The function block of claim 28, wherein the keys comprise respective values to be checked by a client associated with the process control system before reading the respective attributes of the dynamic modifier function block.

31. A machine readable medium storing a dynamic modifier function block of a function block adapted to perform a set of machine readable instructions that, when executed, cause a machine to modify a base function block of the function block within a process control routine, wherein the dynamic modifier function block is to be instantiated or deleted based on at least one attribute of the base function block.

32. The dynamic modifier function block of claim 31, wherein the set of machine readable instructions comprises at least one of a control function, an auto-tuning function, or an interface function.

33. The dynamic modifier function block of claim 31, wherein the function block further comprises an interface to pass data between the base function block and the dynamic modifier function block.

34. The dynamic modifier function block of claim 33, wherein the interface comprises a registered callback function to write data values to the base function block.

35. The dynamic modifier function block of claim 33, wherein the interface comprises data values to be read by the dynamic modifier function block.

36. The dynamic modifier function block of claim 33, wherein the interface includes memory address values associated with data values to be read by the dynamic modifier function block.

37. The dynamic modifier function block of claim 31, wherein the attribute is modifiable after the base function block has been compiled and stored in a machine readable memory associated with the machine.

38. The dynamic modifier function block of claim 31, wherein the machine comprises a processor located in a field device having memory to store the machine readable instructions.

* * * * *